United States Patent
Merszei (10) Patent No.: US 11,304,467 B2
(45) Date of Patent: Apr. 19, 2022

(54) FLEXIBLE EYELASH GLUE FOR AN ARTIFICIAL EYELASHES EXTENSION SYSTEM

(75) Inventor: Sophy Merszei, Houston, TX (US)

(73) Assignee: NovaLash, Inc., Houston, TX (US)

( * ) Notice: Subject to any disclaimer, the term of this patent is extended or adjusted under 35 U.S.C. 154(b) by 0 days.

(21) Appl. No.: 11/838,918

(22) Filed: Aug. 15, 2007

(65) Prior Publication Data

US 2008/0196732 A1  Aug. 21, 2008

Related U.S. Application Data

(63) Continuation-in-part of application No. 11/380,277, filed on Apr. 26, 2006, now abandoned.

(60) Provisional application No. 60/712,757, filed on Aug. 30, 2005, provisional application No. 60/743,948, filed on Mar. 30, 2006.

(51) Int. Cl.
*A41G 5/02* (2006.01)
*G09B 19/00* (2006.01)

(52) U.S. Cl.
CPC .............. *A41G 5/02* (2013.01); *G09B 19/00* (2013.01); *G09B 19/003* (2013.01)

(58) Field of Classification Search
CPC ....... A61L 24/00; A61L 24/0015; A61K 8/72; A61K 8/02; A61K 8/87; A41G 5/02; A61Q 90/00; A61Q 1/02; A61Q 1/04; A61Q 1/06; A61Q 1/08; A61Q 1/10; A45D 8/02; A45D 8/20
USPC ........................... 132/53, 201, 216; 424/448
See application file for complete search history.

(56) References Cited

U.S. PATENT DOCUMENTS

| | | | | |
|---|---|---|---|---|
| 1,831,801 | A * | 11/1931 | Birk | A41G 5/02 |
| | | | | 132/53 |
| 2,324,271 | A * | 7/1943 | Adler | 132/201 |
| 2,655,148 | A * | 10/1953 | Eberl et al. | 602/8 |
| 2,784,215 | A * | 3/1957 | Joyner | 558/307 |
| 3,315,689 | A | 4/1967 | Melik | |
| 3,447,542 | A * | 6/1969 | McCullough | 132/53 |
| 3,833,007 | A * | 9/1974 | Jacobs | 132/53 |
| 3,935,872 | A | 2/1976 | Aylott | |

(Continued)

FOREIGN PATENT DOCUMENTS

JP   2006297038 A  * 11/2006

OTHER PUBLICATIONS

European Patent Application No. 06744718.5 Search Report dated Mar. 18, 2015, 6 pages.

(Continued)

*Primary Examiner* — Yogesh P Patel
*Assistant Examiner* — Jennifer Gill
(74) *Attorney, Agent, or Firm* — Conley Rose, P.C.

(57) ABSTRACT

Disclosed is a quality controlled artificial eyelashes extension system having a method and materials for the application of artificial lash hairs onto existing natural eyelashes of a human subject to extend the length of the natural eyelash. The system provides the training and materials to attach the eyelash extensions on a hair-by hair basis to a subject's existing natural eyelash, as well as a quality control feature which provides for assuring that practitioners of the system are appropriately trained, and the consumable materials utilized by the system are safe for human use. Included in the system is a fluent eyelash glue which forms a flexible, bio-compatible bond between two hairs to be adhered together.

2 Claims, 5 Drawing Sheets

(56) References Cited

U.S. PATENT DOCUMENTS

| | | | |
|---|---|---|---|
| 4,018,336 | A | 4/1977 | Aylott |
| 4,029,111 | A | 6/1977 | Barton |
| 4,299,242 | A * | 11/1981 | Choe .................. A41G 5/02 132/53 |
| 4,589,430 | A | 5/1986 | Sussman |
| 4,854,307 | A | 8/1989 | Elfenbein |
| 5,016,658 | A | 5/1991 | Green |
| 5,050,624 | A | 9/1991 | Kobe et al. |
| 5,178,170 | A | 1/1993 | Kassai |
| 5,340,873 | A * | 8/1994 | Mitry ......................... 525/10 |
| 5,813,420 | A | 9/1998 | Sussman |
| 5,957,142 | A | 9/1999 | Karafilis |
| 5,971,763 | A | 10/1999 | Yau |
| 6,029,674 | A * | 2/2000 | Han ........................... 132/216 |
| 6,183,593 | B1 * | 2/2001 | Narang ............ A61L 15/585 156/327 |
| 6,305,389 | B1 | 10/2001 | Bakken |
| 6,308,716 | B1 | 10/2001 | Han |
| D467,034 | S | 12/2002 | Jaggers |
| 6,640,814 | B1 | 11/2003 | Burke |
| 6,733,856 | B2 * | 5/2004 | Nojiri ....................... 428/40.1 |
| 6,852,325 | B2 | 2/2005 | Loginova et al. |
| 7,600,519 | B2 | 10/2009 | Dinh |
| 2002/0056465 | A1 | 5/2002 | Shin |
| 2002/0124865 | A1 | 9/2002 | Davis |
| 2003/0005941 | A1 | 1/2003 | Iosilevich |
| 2005/0022838 | A1 | 2/2005 | Davis |
| 2005/0042266 | A1 * | 2/2005 | Narang .................... 424/448 |
| 2005/0061341 | A1 | 3/2005 | Choe |
| 2005/0166939 | A1 | 8/2005 | Stroud |
| 2007/0023062 | A1 * | 2/2007 | McKinstry ............ A41G 5/02 132/201 |
| 2007/0272264 | A1 * | 11/2007 | Byrne ................... A41G 5/02 132/201 |

OTHER PUBLICATIONS

Office Action dated Sep. 25, 2017, for Canadian Patent Application No. 2,620,443 (4 pgs).
International Application No. PCT/IB2006/001293 International Search Report and Written Opinion dated Aug. 27, 2007 (6 pages).
Anonymous, Barbers and Cosmetologists, 1998/1999, Occupational Outlook Handbook, ABI/INFORM Global, pp. 324-325.
Koerner, Brendan I., Fake Lashes: Not just for Tammy Faye, The New York Times, Section 3, col. 4, Sunday Business, p. 2, Apr. 25, 2004.
Canadian Patent Application No. 2,620,443, Office Action dated Sep. 13, 2012, 4 pages.
Canadian Patent Application No. 2,620,443, Office Action dated Oct. 8, 2013, 3 pages.
Australian Patent Application No. 2006286346, Examination Report dated Mar. 22, 2010, 4 pages.
Australian Patent Application No. 2006286346, Examination Report dated May 4, 2011, 2 pages.
Australian Patent Application No. 2006286346, Examination Report dated Oct. 28, 2011, 2 pages.
Australian Patent Application No. 2012201123, Examination Report dated May 8, 2014, 4 pages.
European Patent Application No. 06744718.5, Office Action dated Feb. 20, 2017 (7 pages).

* cited by examiner

FLEXIBLE EYELASH GLUE FOR AN ARTIFICIAL EYELASHES EXTENSION SYSTEM

CONTINUITY DATA

The present application is a continuation-in-part and claims the benefit of prior filed U.S. patent application Ser. No. 11/380,277 filed 26 Apr. 2006, which in turn claims the benefit of U.S. patent application Ser. No. 60/712,757 filed 30 Aug. 2005 and Ser. No. 60/743,948 filed 30 Mar. 2006.

FIELD OF THE INVENTION

The present invention is in the field of cosmetic materials and their proper use. More specifically, the present invention relates personal grooming and artificial eyelashes adapted for attachment on hair growing from an eyelid, and the composition of a glue which when cured provides a flexible bond attaching the artificial eyelash to the natural eyelash.

BACKGROUND OF THE INVENTION

The cosmetic use of artificial eyelashes by persons in the making of their toilet is old in the art. Because cosmetic compositions and materials are typically intended for use by persons, it is important that the cosmetic materials and composition be clearly suitable for human use, and that the materials and methods used be very simple to practice, or that they be designated and controlled for practice by individuals trained in their safe application, especially adhesive compositions and solvents. This is particularly important for cosmetic products intended for use in the area of a subject's eyes because of the sensitive and delicate nature of the organs and tissues involved. So, it is important in the field to provide materials and compositions appropriate for human use, and also important to provide education and training in the proper use of such materials and compositions.

Typically, artificial eyelashes are applied as a group or cluster to the skin of a wearer's lower and/or upper eyelid. Some examples include US patent publication no. 2005/0061341 to Choe, US patent publication no. 2002/0056465 to Shin and U.S. Pat. No. 6,029,674 to Han. The field has even been motivated to combine the cosmetic effect of artificial eyelashes and eyeliner, as in U.S. Pat. No. 4,029,111 to Barton. In addition to adhering other decorative cosmetic devices such as glitter flakes, costume gems, etc. to the skin of the wearer's eyelids is also known in the field to adhere decorative devices to a subject's eyelashes, as illustrated in US patent publication no. 2003/0005941 to Iosilevich. However, these references do not teach or disclose the application of artificial eyelashes to the existing natural eyelashes of a subject wearer.

The cosmetics field has recognized the importance of training and training aids to the skills of well qualified practitioners, and has been motivated to develop such training aids. For example, see U.S. Pat. No. 5,971,763 to Yau for a teaching method and a teaching aid. The field has also embraced the principle of training and certifying practitioners of certain of the cosmetic arts to one degree or another as required under the authority of various local jurisdictions, or by the industry itself. Therefore, when a new cosmetic procedure becomes available that may represent some level of risk to a subject, it would be beneficial to have a means of controlling the quality of the practitioners involved with the new procedure and the quality of the materials and compositions used in the procedure.

SUMMARY OF THE INVENTION

The present invention is in the field of cosmetics that serve to modify or improve the appearance of a physical feature of the human countenance, and the methods and materials for their safe use. The present invention comprises a quality controlled artificial eyelashes extension system. In part, the system provides for the application of the artificial lash hairs onto the existing natural eyelashes of a human subject to extend the length of the natural eyelash. By this feature, the present eyelash extensions differ from typical false eyelashes, in that the present lash hairs correspond (are attached to) an existing natural eyelash.

The quality control feature of the present lash extension system resides in its assurance that the practitioners of the system are appropriately trained, and the consumable materials utilized by the system safe for use on humans. The system provides for quality control assurance of practitioners and of consumable materials by having programs for practitioner training and certification, and a program for materials quality assurance which controls the quality of the system's consumable materials and makes such materials available to practitioners.

The present eyelash extensions are a fun and safe alternative to mascara or false lashes, but consumers and professionals should follow some basic guidelines when choosing both the product and a practitioner to install the product, a care that may not be obvious to the ordinary consumer when choosing a lash extension product. The present system alleviates this need for such care.

Generally, the present quality controlled artificial eyelashes extension system comprises a system administrator, practitioner training and certification programs, and a materials quality control program. The system administrator component provides the oversight to implement the quality control assurance of the system's practitioners and consumable material according to a quality assurance criteria. The training program provides for the education of a practitioner of the system. Practitioners of the system are individuals trained in proper practice of the method of the system for applying artificial lash hairs on a hair-by-hair basis to a human subject's individual eyelashes, and in the proper use of approved artificial eyelashes materials. The training program provides for the quality control assurance that appropriate training to practice the method and to use the approved artificial eyelashes materials in a manner safe on the human subject is available to a participant. The certification program provides for several quality assurance features of the present system, including certifying: that a participant has successfully completed a training program in the method of the present artificial eyelashes system; whether the participant's training status is current; and that the participant is authorized to utilize the system's approved artificial eyelashes materials. The materials quality control program assures the system's consumable artificial eyelashes materials comply with a materials and composition quality criteria, and makes the quality assured consumable materials available to practitioners.

DETAILED DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

Figure 1:
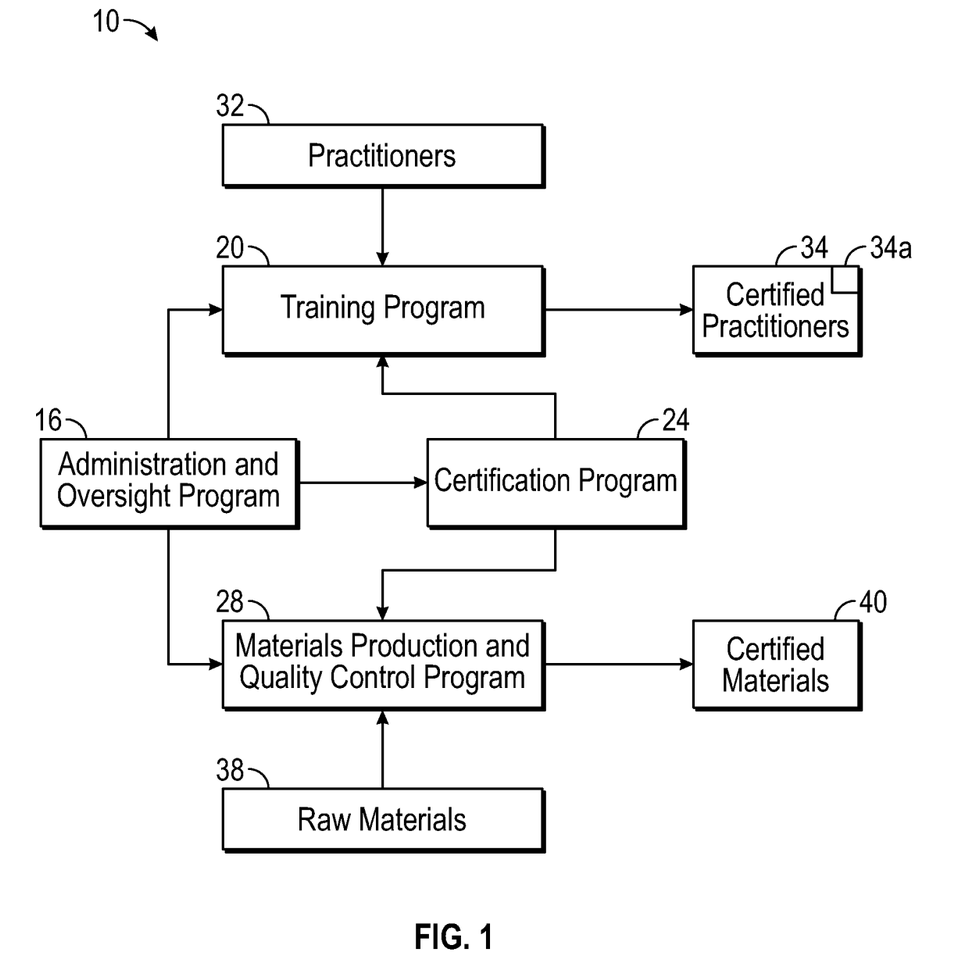
FIG. 1 is a flow chart illustrating the quality controlled artificial eyelashes extension system of the present invention.

As illustrated in FIG. 1, the present invention is an artificial eyelashes extension system 10 providing certified practitioners 34 and consumable materials 40 quality assured for human use. Because the system 10 is intended for human use, the health and safety aspects of the system 10 and its component parts are a feature of the present invention. In the preferred embodiment illustrated, the quality controlled artificial eyelashes extension system 10 comprises a number of program components and inputs and outputs of people and materials. The present system 10 includes a number of program components, and has inputs of people (trainee-practitioner) 32 and raw materials 38 and outputs of certified practitioners 34 and quality assured materials 40. See Table I.

programs of the system 10 and functions to implement the quality control assurances of the system's certified practitioners 34 and consumable material 40 according to a quality assurance criteria (ISO 9000). In the preferred embodiment illustrated, the present system 10 also includes a training program 20, a certification program 24, and a materials quality control program 28. Quality assured consumable materials 40 are accomplished by processing raw materials 38 at a facility that has met National Quality Assurance (NQA) certification under ISO 9000 standards. The inputs to the system 10 comprise "untrained" persons 32 and raw materials 38. Outputs from the system include persons who are certified practitioners 34 and certified consumable materials 40.

Figure 2:
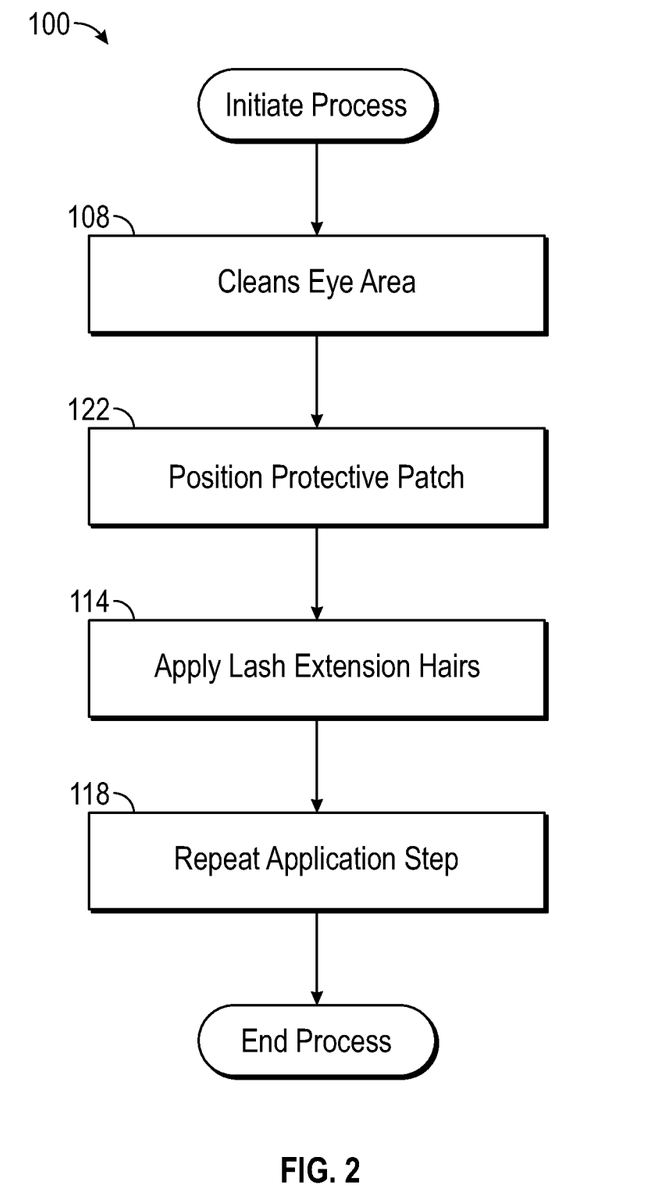
FIG. 2 is a process flow chart illustrating an overview of the method of the present system.
Figure 3A:
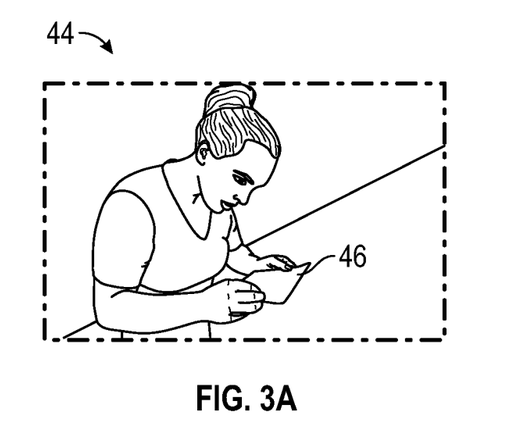
FIGS. 3A and 3B respectively are photographic images illustrating a live workshop component of the training program and an instructional video media component of the training program.
Figure 3B:
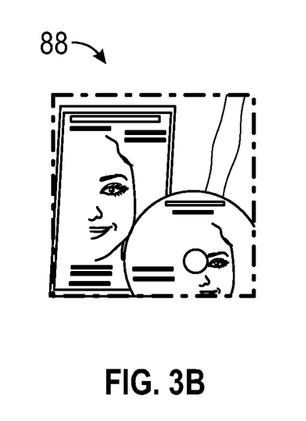

The training program 20 provides instructions and training to persons 32 who desire to enter the system 10 and become a certified practitioner 34 of the present lashes extension system 10. Such "untrained" persons 32 may be cosmetologists or other beauty/cosmetics professionals, or existing practitioners seeking to upgrade their education in the field or to update their certification. The training program 20 provides trainees 32 with instructions in the proper practice of the system's lash extension method 100 (see FIG. 2). The training program 20 can be implemented by using instructional materials selected from any one or more of a number of educational means. Such instructional materials include: video media 88 (see FIG. 3B) having participant training material included therein, live workshop training sessions 44 (see FIG. 3A), video-conferencing training sessions, multi-media training courses, and self-training kits.

Figure 5A:
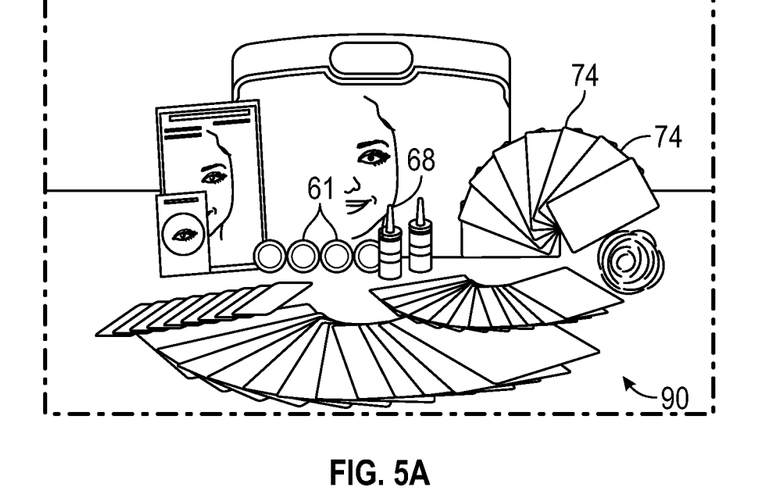
FIG. 5A is a photographic image illustrating a training kit and its contents.

In the preferred embodiment illustrated, the training program 20 was implemented not only using live workshop training sessions 44, but also with self-starter/self-training kits 90 (see FIG. 5A). A starter training kit 90 contains all the items required for a professional in the field to get started. Each kit 90 serviced approximately 200 client subjects when used properly. A typical self-training kit 90 contained: an instructional video (DVD) 88; containers 61 of three different lengths of lash extension hairs 60: 8 mm, 10 mm, 12 mm; surgical quality stainless steel fine point forceps—straight and curved; double-sided glue dipping trays/dishes; a lash comb and brush; pharmaceutical grade, non-fume adhesive 68; adhesive remover; air blower for accelerating curing of the adhesive; shaped lower lash protectors 74; medical tape

TABLE 1

| System Program Components | |
|---|---|
| Administration Program | Provides oversight of System operations and implementation of System Programs |
| Training Program | Provides education and training to participants in the proper use of the System's methods and materials |
| Practitioner Certification Program | Provides for certifying that participants and materials meet the System's quality assurance criteria |
| Materials QC Program | Provides quality assurance of the consumable materials used to practice the System's methods |
| Practitioner/Trainee (input) | Persons entering the Training Program |
| Certified Practitioners (output) | Persons successfully completing the Training Program |
| Raw Materials (input) | Raw materials entering Material QC Program |
| QC Materials (output) | Quality assured materials for use by Practitioner |

The system administrator/administration oversight program 16 provides management and oversight of the other for sensitive skin; aftercare instructions; and explanatory product brochures for subjects.

Also, the preferred embodiment utilizing workshop training sessions 44 and self-training kits 90 further comprises a testing means for assessing a participant's successful completion of the training program 20. Additionally, in the preferred embodiment, the training program instructional materials included an artificial human countenance 46 on which to practice the method 100 of the present system 10 for applying artificial eyelash extension hairs 60.

The workshop training sessions 44 comprised a 6-7 hour high intensity workshop. The course included a theory section from a workbook, and discussed not only the basic extension method 100, but also the science behind the method 100, health and safety issues and some advanced practices. At the completion of the lecture portion of the training workshop 44, trainees were required to take the theoretical part of the certification test. During the practicum portion of the workshop 44, trainees practiced the extension method 100 on an artificial human countenance 46 (a mannequin head) as well as on live human models. Class size was kept small to ensure that each participant received personalized instruction and attention from the trainer.

The artificial eyelash extension method 100 of the present system provides for applying artificial eyelash extension hairs 60 on a hair-by-hair basis to a human subject's individual eyelashes 64 in a manner safe for the human subject 70. The present lash extensions system 10 is currently for professional use only. At home use or use by non-professionals currently is not recommended, as it may result in damage to eyes or loss of vision. Generally, the steps of the method include:

cleansing 108 the area of the subject's eyes with mild cleanser prior to application. Note: use of eye makeup removers containing PEG (polyethylene glycol), propylene glycol, or any other glycol-based ingredients can result in failure of lash hairs 60 to bond.

applying 114 artificial eyelash extension hairs 60 on a hair-by-hair basis to the human subject's individual eyelashes 64, using a low/non-blooming, oil and water resistant adhesive 68 consisting of 100% pure U.S. Pharmaceutical Grade ingredients. Note: a preferred adhesive/glue 68 of the present system 10 was high viscosity, low-blooming and low-fuming, and contained a black pigment/colorant. The intended viscosity of the glue 68 is between about 800 and 2000 cP. In the preferred embodiment of the figures, the glue 68 was an ethoxyethyl cyanoacrylate based composition.

repeating 118 the applying step 114 an appropriate number of times to have applied at least one artificial lash hair extension 60 to a desired number of the subject's existing natural eyelashes 64. Note: not every one of the subject's natural eyelashes 64 may need to have an extension lash hair 60 adhered to it, and more than one extension lash hair 60 may be attached to the same existing natural eyelash 64. The desired density of artificial lash extension hairs 60 in a particular subject's case is a personal preference and is determinable by one of ordinary skill in the art.

Figure 4A:
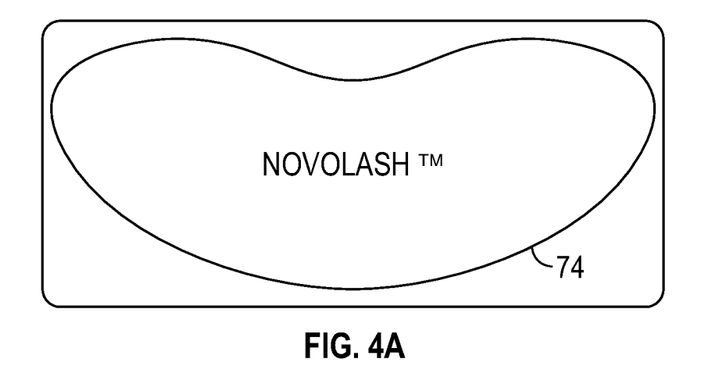
FIGS. 4A and 4B respectively a top plan view of a lash patch stored on a backing sheet, and a photographic image illustrating positioning and use of the lash patch on a subject.
Figure 4B:
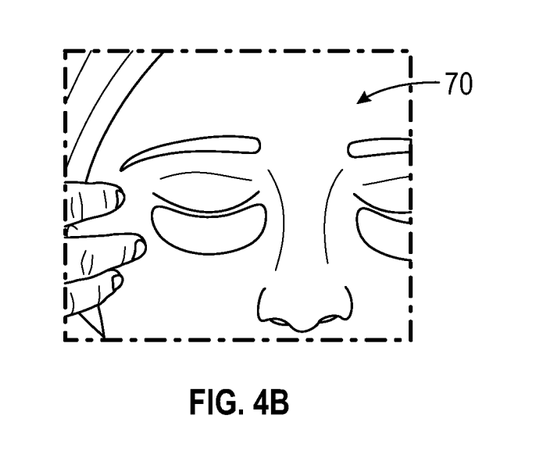
Figure 5B:
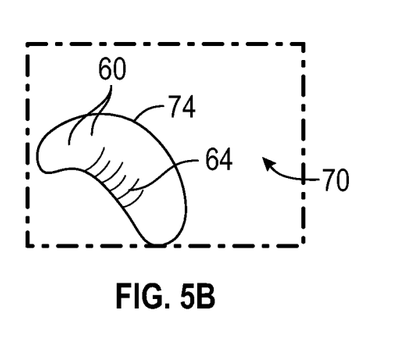
FIG. 5B is a photographic image of a subject undergoing the application of lash extensions to existing natural eyelashes.
Figure 5C:
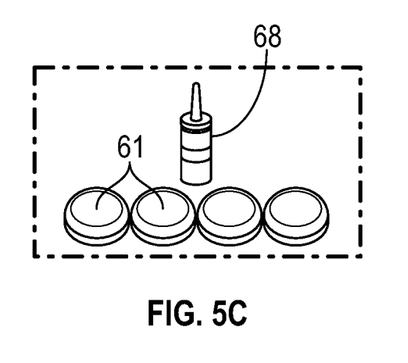
FIG. 5C is a photographic image of the present quality assured safe adhesive and containers of the present lash extension hairs.

In the preferred embodiment illustrated in FIG. 5B, after the cleansing step 108, a site preparation step was practiced. The site preparation step comprised: positioning 122 an eyelid separating film or patch 74 over the eyelashes and adjacent eyelid rim of an (usually lower) eyelid (not being worked on) that is to be separated from the eyelashes of the eyelid being worked on. The eyelid separating patch 74 is a very easy and economical way to protect and separate, for example, the lower eyelid's lashes from the upper eyelids lashes while the latter are being worked on. See FIG. 4B.

The patch/film 74 has a hypo-allergenic adhesive film (not shown) that adheres lightly to the delicate skin of the eye area, and is removable without pulling the skin or dislodging healthy eyelashes.

A subject 70 must take care to not rub or scratch the eyes after application of the artificial eyelash extensions 60. Also, after the extensions 60 are adhered to the subject's natural eyelashes 64, only NON-waterproof mascara may be used. Use of waterproof mascara can cause lashes to loosen. Repeated use of even water soluble mascara may shorten the life of the lash extensions 60. Use of eye makeup removers containing PEG (polyethylene glycol), propylene glycol or any other glycol-based ingredients can result in failure of lash hairs bonds. Eye creams, eye makeup remover and facial moisturizers containing oils or solvents can cause the lash extensions 60 to loosen. Therefore, it is recommended that eye creams be used sparingly and to avoid the lash line area.

The present artificial eyelashes extension system 10 provides for the lengthening and thickening of a subject's eyelashes 64. Applying the individual artificial lash hairs 60 on a hair-by-hair basis to the subject's own lashes 64 provides a totally natural look. When properly applied the present eyelash extensions 60 can last up to two months or more. Touch-ups are recommended after initial full set application to replace any lash extension hairs 60 that might may be dislodged or fall off because they were attached to a "beyond maturity natural" existing natural eyelash 64. An important object of the present system 10 is to provide safe lash extensions that when properly applied will last for the length of the natural growth cycle of each eyelash of the subject to which the extensions are attached.

The certification program 24 provides for the certification of persons 32 that successfully complete a training program 20 of the system 10, and provides a hardcopy certificate 34a to such participant. The certificate 34a evidences to the public and to interested subjects that the certified practitioner 34 has successfully completed a system training program and is authorized to utilize the system's approved artificial eyelashes materials. The certificate 34a can also evidence the level of training of the certified participant 34 and whether the participant's training is current. The certification program 24 is also responsible for certifying that the consumable artificial eyelashes materials 40 provided under the aegis of the system 10 meet the appropriate quality assurance criteria.

The materials quality control program 28 provides that the system's products are produced from the raw materials in a manner consistent with the system's ISO 9000 quality assurance criteria. This is accomplished as noted above, by having critical compositions formulated using USP grade materials in a National Quality Assurance (NQA) certified facility.

The adhesive/glue 68 of the present invention is surgical quality and approved for use in the eye area of humans. To the contrary, most lash adhesives currently produced and imported from Asia are industrial quality adhesives that are not FDA approved for cosmetic or medical applications. For example, many black pigmented cyanoacrylate adhesives were originally formulated with the automotive industry in mind, and can contain impurities that are not safe for use on humans. It is a feature of the adhesive 68 of the present invention that its ingredients are "USP" or "U.S. Pharmaceutical Grade-Class IV." This means that the adhesive is pure, medical quality surgical glue, and is safe for use on the eye area. Generally, a patch test is not required to check for skin reaction, because the lashes and glue are intended to not come in contact with skin the subject's skin. The adhesive/ glue 68 of the present invention is high viscosity, preferably low blooming & low fuming and contains a black pigment/ colorant. "Bloom" refers to the powdery-looking deposit that can form on the cured glue as a result of a process similar to chemical efflorescence. The intended viscosity of the glue is between about 800 and 2000 cP. In a preferred embodiment, the glue was an ethoxyethyl cyanoacrylate based composition, having the physical characteristics noted above. An example of base glue composition practicable in the present invention is Apollo 5100, or cyanoacrylate adhesive 5100 (Cyberbond, LLC, Batavia, Ill.; cyberbond1.com Apollo 5100 includes the ingredients 21982-43-4, 2-ethoxy ethyl 2-cyanoacrylate; 26915-72-0, Methoxy Polyethylene Glycol 1000 Methacrylate: and 123-31-9, 1,4-dihydroxybenzene (cyberbond1.com/product-detail/apollo/5100/, see "Safety Data Sheet").

However, in a most preferred embodiment, the present invention includes a fluent eyelash glue 68 which, when cured, forms a flexible, bio-compatible bond between two (or more) hairs to be adhered together. The eyelash glue 68 comprises a liquid adhesive composition, a viscosity agent, and a ductility agent. The elements of the composition when appropriately combined yield a fluent glue 68 which provides a flexible bio-compatible bond when cured. Additionally, the glue 68 contains a pigment and is adapted to match a color of the hairs being adhered together. The present eyelash glue 68 is fast-drying and adapted for adhering a single lash hair to an individual eyelash of the subject by having an appropriate viscosity.

The ductility agent is an elastomer soluble in the solvent system of the adhesive composition, the adhesive composition preferably being an ethyl cyanoacrylate composition as described elsewhere. The ductility agent acts as a plasticizer to make the cured bond between the adhered hairs more flexible than the glue would be with out the elastomer. An elastomer can any of various polymers compatible with the glue's solvent system and having the elastic properties of natural rubber. Urethane rubber was used in this preferred embodiment. Although it might be expected that increased flexibility of the bond could increase the comfort level of having the present lash extensions, it was not expected that softening the cured glue would result in an increase in durability of the bond. In fact, durability was substantially improved, with durability increasing on the order of from two week to eight weeks. A further unexpected benefit was that the aesthetic appearance of the cured glue was improved. More specifically, the "crumbly," "crusty" and/or "flaky" appearance of the cured adhesive that developed over time was reduced of eliminated. A still further aesthetic benefit was that the cured glue had an improved finish, i.e., less flat and more glossy. A suitable USP quality flexible eyelash extension glue formulation 68 tested and adapted for use in the present invention is commercially available from Cyberbond, LLC (Batavia, Ill.) as Cyberbond 3352 (a cyanoacrylate adhesive) and as Cyberbond 6352 (a low/no fume cyanoacrylate adhesive).

It is intended that the practice of the present system 10 be carried out by a licensed cosmetologist, esthetician, permanent makeup technician or beautician. Further, it is intended in the present system 10 the such practitioner be specifically certified to provide lash extension services using system 10. An instructional video 88 is provided with the kit of the present invention as well as instructional material in the kit itself. Additionally, as part of the certification to practice the present system, it is intended that 5-10 practice sessions are required before certifying practitioners to use the present system 10.

In a preferred embodiment of the kit 90 of the present system, one kit will provide approximately 200 subject applications when used properly. Only one drop of glue is required per client, and 30 to 40 lashes. To provide this many applications for different subjects and to create a more natural, feathery, thick look, the preferred embodiment of the kit includes three lengths of individual artificial eyelashes. Longer lashes can be used towards the center or at the corner of the eye, depending on a subject's style preference.

Figure 6:
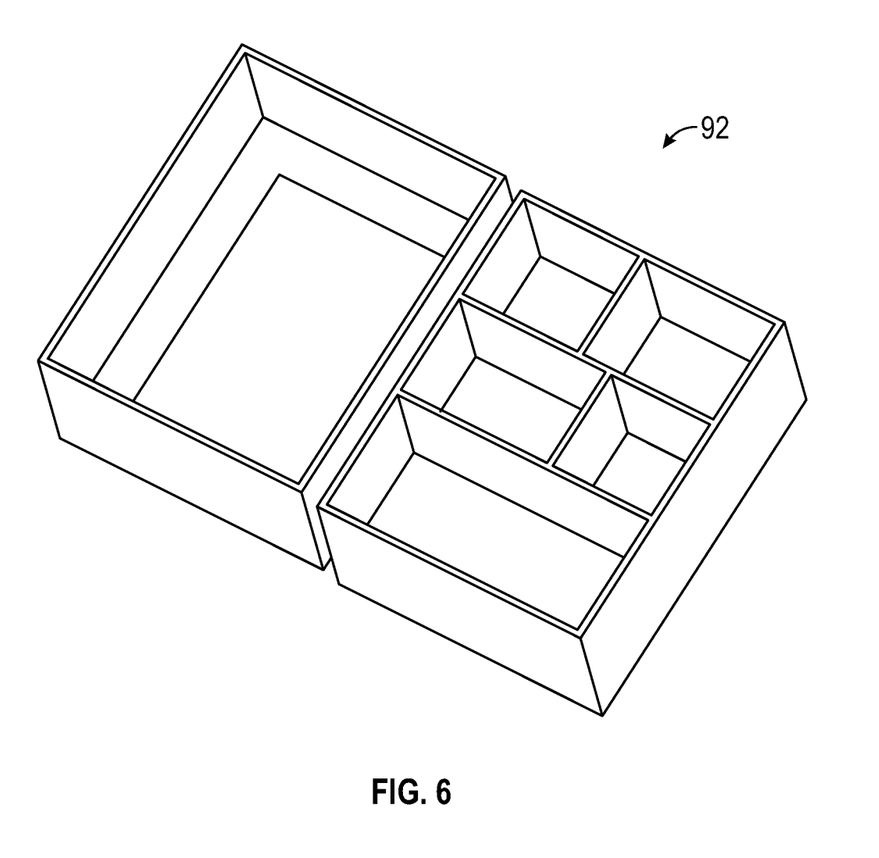
FIG. 6 is a top plan drawing of an exemplary layout for a kit container of the present invention.

As shown in FIG. 6, an artificial eyelashes kit for use on humans with the present artificial eyelash extension system 10 includes a lidded housing 92 for holding all of the other components of the kit 90. In a preferred embodiment of the kit 90, the lidded housing 92 was compartmented to hold similar components together, but separate from other different components and was closeable by means of the lid. The kit 90 contained a plurality of single artificial eyelashes such as are known in the field. A supply of a specific length of single artificial eyelashes was stored in an eyelash container 61. A plurality of eyelash containers 61 were included in the kit 90 for storing a selection of different length individual eyelashes.

Figure 7:
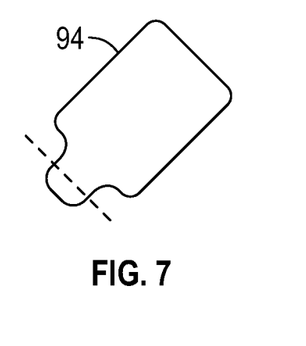
FIG. 7 is a perspective drawing of an exemplary single use foil/film packet for containing and dispensing either the glue or the solvent of the present invention.

At least one implement such as forceps or tweezers for grasping and manipulating an individual artificial eyelash in included in the kit. Preferably, more that one such implement is included. Such implements are known in the field and selectable by one of ordinary skill for use in the present kit. At least one dispensing container of a fast-drying glue for adhering the individual eyelashes to a subject's existing eyelashes is included in the kit. In a preferred embodiment, a plurality of single use dispensing containers 94 are supplied with the kit. See FIG. 7.

The preferred kit further included: a grooming tool useful for manipulating the subject's existing eyelashes to facilitate proper application of the individual eyelash, and a plurality of eyelid contour patches. The eyelid contour patches had an adhesive on one side and were useful to provide a surface for separating the upper eyelid lashes from the bottom eyelid lashes during application of individual lashes to one or the other eyelids, but especially when applying individual lashes to the upper eyelid. As noted above, the kit also included instructions on the proper practice of the invention to apply the artificial eyelashes on humans.

In the preferred embodiment, the artificial eyelashes kit further included at least one dispensing container of eyelash remover to dissolve the glue adhering the artificial eyelashes to the subject's eyelashes. Such solvent are known in the art and in view of the present disclosure are selectable by the ordinary skilled artisan for practice in the present invention. An example of such a remover solvent is UNDO 6020, a cyanoacrylate remover (Cyberbond; cyberbond1.com). UNDO 6020 includes the ingredient 75-52-5 nitromethane (cyberbond1.com/adhesives/adhesive-remover/, see "Safety Data Sheet"). The instructions included the proper practice of the invention to remove the artificial eyelashes on humans.

Optionally, the kit may contain other components as desired to further facilitate practice of the invention on humans. These include a number of components useful for their ordinary purposes in the field of cosmetology, such as make-up brushes, a suction bulb useful for providing a gentle stream of air to enhance drying time of the glue as well as its other ordinary uses in cosmetology, and cotton swabs. A roll of plastic medical adhesive tape can be included as an alternative to the eyelid contour patches, and a number of petri dish type vessels can be included as secondary holders for smaller, more manageable numbers of individual artificial eyelashes. Additionally, in a preferred embodiment, a mirror was mounted on the inside of the lid of the lidded housing 92.

While the above description contains many specifics, these should not be construed as limitations on the scope of the invention, but rather as exemplifications of one or another preferred embodiment thereof. Accordingly, the scope of the invention should be determined by the scope of the appended claims and their equivalents, and not just by the embodiments.

What is claimed is:

1. An eyelash extension, comprising:
   a single artificial eyelash hair bonded with an adhesive composition, wherein the single artificial eyelash hair is configured to be adhered to a single natural hair, and wherein the adhesive composition consists of:
   a glue, wherein the glue is an ethoxyethyl cyanoacrylate;
   a thickening agent which adapts the eyelash extension adhesive to have a viscosity between 800 and 2000 cP at room temperature;
   a ductility agent, wherein the ductility agent is urethane rubber; and
   a pigment.
2. The extension of claim 1 wherein the adhesive composition yields a bond that is bio-compatible.

\* \* \* \* \*